(12) United States Patent
Lewis et al.

(10) Patent No.: US 6,486,988 B1
(45) Date of Patent: Nov. 26, 2002

(54) UPGRADING OPTICAL COMMUNICATIONS SYSTEMS WITHOUT TRAFFIC INTERRUPTION

(75) Inventors: David O Lewis, Stratford upon Avon (GB); Robert C Goodfellow, Northants (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/391,763

(22) Filed: Sep. 8, 1999

(30) Foreign Application Priority Data

Jul. 15, 1999 (GB) .............................................. 9916577

(51) Int. Cl.[7] .................................................. H04J 14/02
(52) U.S. Cl. ........................... 359/127; 359/124; 385/24
(58) Field of Search ................................. 359/127, 124, 359/130, 128; 385/24

(56) References Cited

U.S. PATENT DOCUMENTS

| | | | |
|---|---|---|---|
| 5,557,439 A | 9/1996 | Alexander et al. | |
| 5,760,934 A | 6/1998 | Sutter et al. | |
| 6,069,719 A | * 5/2000 | Mizrahi | 359/124 |
| 6,351,581 B1 | * 2/2002 | Doerr et al. | 385/24 |

FOREIGN PATENT DOCUMENTS

EP        0 717 521 A2    6/1996

OTHER PUBLICATIONS

Quantifying the benefit of wavelength add–frop in WDM rings with distance–independent & dependent traffic, Simmons, J., et al., J. Lightwave Technology, vol. 17, No. 1, Jan. 1999, pp. 48–57.

* cited by examiner

Primary Examiner—John Tweel
(74) Attorney, Agent, or Firm—Kirschstein et al.

(57) ABSTRACT

A method for upgrading an-optical communications system in which the system comprises a plurality of nodes linked by one or more optical paths. Each path for the communication of traffic includes a single optical channel. Each node comprises add/drop multiplexers (ADM) for adding and dropping signals in electrical form, and conversion circuitry for converting between electrical and optical form signals output by the ADM for transmission via a first one of the optical paths, and for converting signals received via a second one of the optical paths for input to the ADM. The method comprises the steps of installing optical demultiplexers for selecting signals received via the second one of the optical paths according to wavelength for input to the ADM; installing circuitry for converting the signals output by the ADM into a first stable narrow wavelength band optical signal; and installing optical multiplexers for guiding the first signal into the first optical path to allow one or more further stable narrow wavelength band optical signals having different wavelengths from the first signal to be added and combined with the first signal into the first optical path.

20 Claims, 10 Drawing Sheets

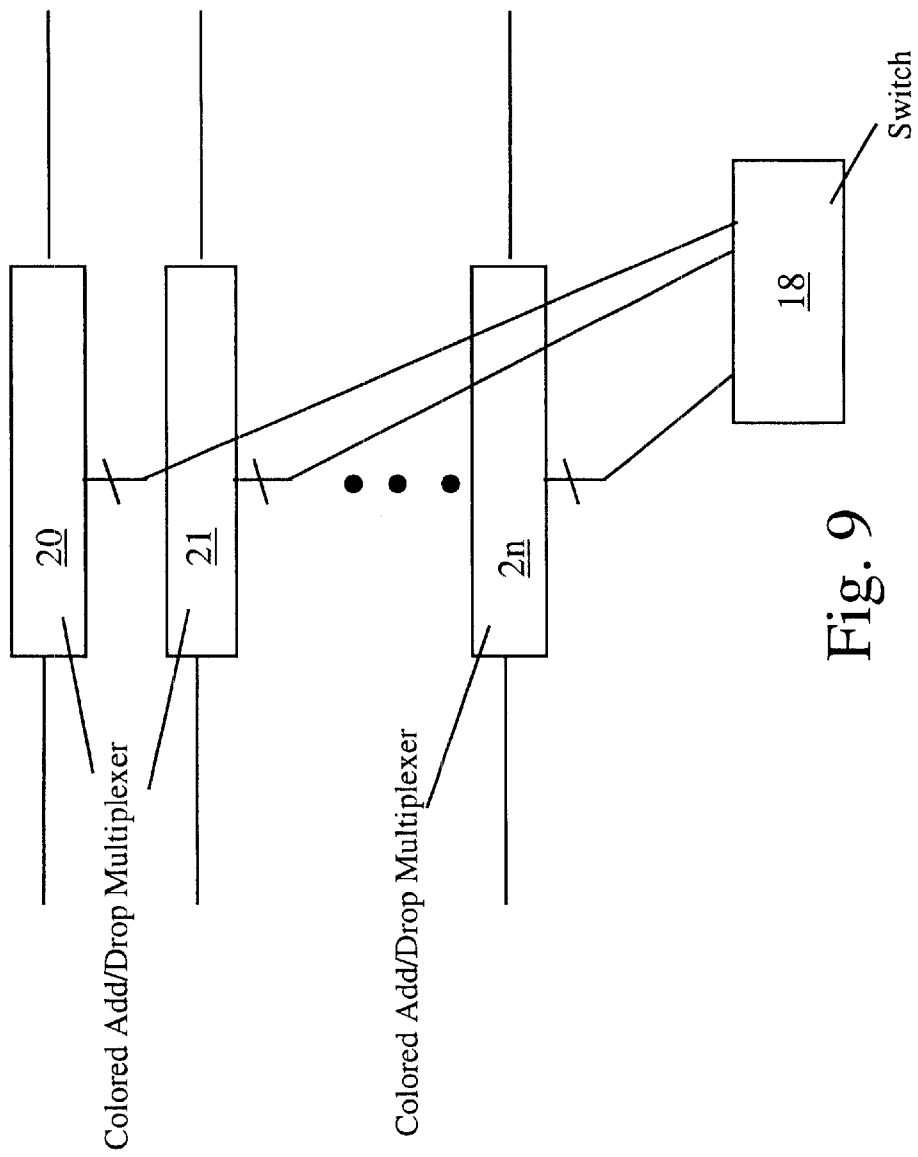

UPGRADING OPTICAL COMMUNICATIONS SYSTEMS WITHOUT TRAFFIC INTERRUPTION

BACKGROUND OF THE INVENTION

The present invention relates to the field of optical communications systems and in particular to a method for upgrading such systems.

Optical communications systems are a substantial and fast-growing constituent of communications networks. The expression "optical communications system", as used herein, relates to any system which uses optical signals to convey information across an optical medium. Such optical systems include, but are not limited to, telecommunications systems and local, metropolitan and wide area networks (LANs, MANs and WANs). Optical systems are described in Gowar, Ed. *Optical Communications Systems*, (Prentice Hall, N.Y.). Currently, the majority of optical communication systems are configured to carry only a single optical channel. In order to signal over this optical channel, a suitably modulated laser is used that emits light in a spectrum the center wavelength of which is not precisely defined (so-called "grey" light). As a result the channel is allocated a relatively broad spectral band. The optical guide is specified to have a sufficiently low attenuation over this relatively broad spectral band to ensure acceptable signal to noise at the receiver. Here "optical guide" is used to describe any suitable optical transmission medium, including optical fibres and optical waveguides.

There is a need to access at nodes of the communications system, which may be comprised of, for example, rings, interconnected rings or meshes, the information carried in such optical guides so that individual messages may be routed to the correct destinations. To this end each node will contain switching circuitry. An economical form of switching circuitry for such nodes is the add-drop multiplexer (ADM). An ADM provides low cost access to all or part of the time division multiplexed (TDM) traffic forming a data stream passing along a communications link, such as an optical guide. The traffic passing through the ADM does so via "line ports" connecting to the bearer. Data or messages passing along the telecommunications bearer are selectively time division demultiplexed by switching circuitry in the ADM and the selected messages or message parts are passed via so-called tributary ports to their destination. Similarly, data or messages for adding to the telecommunications bearer are fed to the ADM via the tributary ports and are time division multiplexed into the message stream by the ADM switching circuitry. This switching and multiplexing function is performed in the electrical domain. In order to interface to an optical communications link, the nodes include optical to electrical converters (i.e. photo-detectors) and electrical to optical converters (i.e. laser signal generators).

The continuing and rapid increase in the amount of data traffic carried by telecommunications operators has led to an increasing need to improve the data carrying ability of existing networks. A conventional TDM communications system may be upgraded purely by increasing the TDM data rate of components of the link. This may call for the electronics equipments to be modified but permits the installed fibre link to be retained and used, thereby saving costs of additional fibre installation (which may be considerable). Current technology imposes strict limits on the gains available from increasing the TDM data rate due to optical sensitivity limitations in the receiver, safety limits to protect, e.g., maintenance workers, which restrict the amount of launch power which can be used, chromatic dispersion causing "eye-closure" in the digital signal at the receiver and other propagation impairments which depend upon TDM signaling rate.

The optical communications link. typically comprises optical fibre. The capacity of a dual fibre line system (in which one fibre is used to carry traffic in each direction) can be increased by introducing 'single fibre working' into each of the fibres. Conventionally traffic flows in the fibre in one direction only. By introducing a directional optical coupler e.g. a fused twisted optical fibre pair coupler, at each end of a fibre, signalling may be effected in both directions on the one fibre. Thus the traffic previously passing on two fibres can be compressed onto one fibre and the second fibre then used as a separate line. This system is impaired by back scattering at the launch components and in the fibre itself and by beating between the signals from the two transmitter lasers (one at each end) and can be improved by selecting lasers with disparate wavelengths. Improved performance also accrues if the signalling wavelengths are chosen such that the receivers can be designed to be insensitive to the 'other' wavelength. This latter procedure was the start of using wavelength selection towards capacity upgrade of fibre systems which has led on to wavelength division multiplexing discussed below.

The capacity of a single fibre line system can be increased by means of wavelength division multiplexing. In a wavelength division multiplexed (WDM) system there is a plurality of optical signals each signal having a spectrum whose center wavelength is constrained within a narrow spectral band, the acceptable pass band of the fibre being divided up into a multiplicity of such narrow spectral bands. By upgrading a single channel system to a two-channel WDM system i.e. replacing the single "grey" channel with two narrow band channels its capacity may be increased. Whilst the TDM up-grade potential is strictly limited, the use of multi-channel WDM has a much greater potential for increased data rates with 8, 16, 32 and more channel WDM systems being proposed.

However, replacing a single channel photonic system with a WDM system supporting many different channels requires the replacement of a considerable amount of equipment at each node with new WDM equipment. This is expensive and may involve considerable over-provision of capacity bearing in mind that a doubling of capacity is often all that is required of a particular upgrade. There is therefore a need for a method for incrementally upgrading the traffic handling capacity of an optical communications system.

SUMMARY OF THE INVENTION

The present invention provides a method for upgrading an optical communications system; in which the system comprises a plurality of nodes of which two are linked by a single optical path for the communication, from the node at a first end of the optical path to the node at the other end of the optical path, of traffic comprising a single optical channel; in which each node comprises add/drop multiplex (ADM) means for adding and dropping signals in electrical form, in which the node at the first end of the optical path comprises a single light source for converting from electrical to optical form signals output by the ADM means for transmission via the optical path; and in which the node at the other end of the optical path comprises a photodetector for converting signals received via the optical path for input to the ADM means; the method including the steps of replacing the single light source at the first end of the optical path with a plurality of stable narrowband light sources having mutually different wavelengths, installing at the first end of the optical path optical multiplex means for multiplexing the outputs of the plurality of stable narrowband light sources into the optical path; replacing the single photodetector at the other end of the optical path with a plurality; installing at the other end of the optical path optical demultiplex means for demultiplexing a like plurality of received optical channels, whereby each of the plurality of optical channels is converted to electrical signals and applied to ADM means.

The present invention also provides a method for upgrading an optical communications system; in which the system comprises a plurality of nodes linked by one or more optical paths, each path for the communication of traffic comprising a single optical channel; in which each node comprises add/drop multiplex (ADM) means for adding and dropping signals in electrical form, and conversion means for converting between electrical and optical form signals output by the ADM means for transmission via a first one of the optical paths; and for converting signals received via a second one of the optical paths for input to the ADM means; the method comprising the steps of installing optical demultiplex means for selecting signals received via the second one of the optical paths according to wavelength for input to the ADM means; installing means for converting the signals output by the ADM means into a first stable narrow wavelength band optical signal; and installing optical multiplex means for guiding the first signal into the first optical path and comprising means for allowing one or more further stable narrow wavelength band optical signals having different wavelengths from the first signal to be added and combined with the first signal into the first optical path.

According to a preferred embodiment, the present invention provides a method comprising switching individual time division multiplexed messages between wavelength multiplexed channels of the optical communications system, comprising the steps of arranging switch means comprising a plurality of add drop multiplex (ADM) means, one per wavelength multiplex channel; in which each ADM means comprises tributary means, the method comprising the steps of interconnecting the ADMs means via the tributary means.

According to a preferred embodiment the present invention provides a method comprising switching individual time division multiplexed messages between a plurality of streams of time division multiplexed data; in which each stream of time division multiplexed data is comprised in a channel of the wavelength multiplexed optical communications system, the method comprising the steps of providing one or more of the nodes with a plurality of add drop multiplex (ADM) means, one per WDM signal; providing each ADM means with tributary means and interconnecting the ADM means via the tributary means.

BRIEF DESCRIPTION OF THE DRAWINGS

Embodiments of the invention will now be described by way of example with reference to the drawings in which:

FIGS. 4 to 9 show alternative arrangements according to further embodiments of the present invention.

DETAILED DESCRIPTION OF THE PREFERRED EMBODIMENTS

Figure 1:
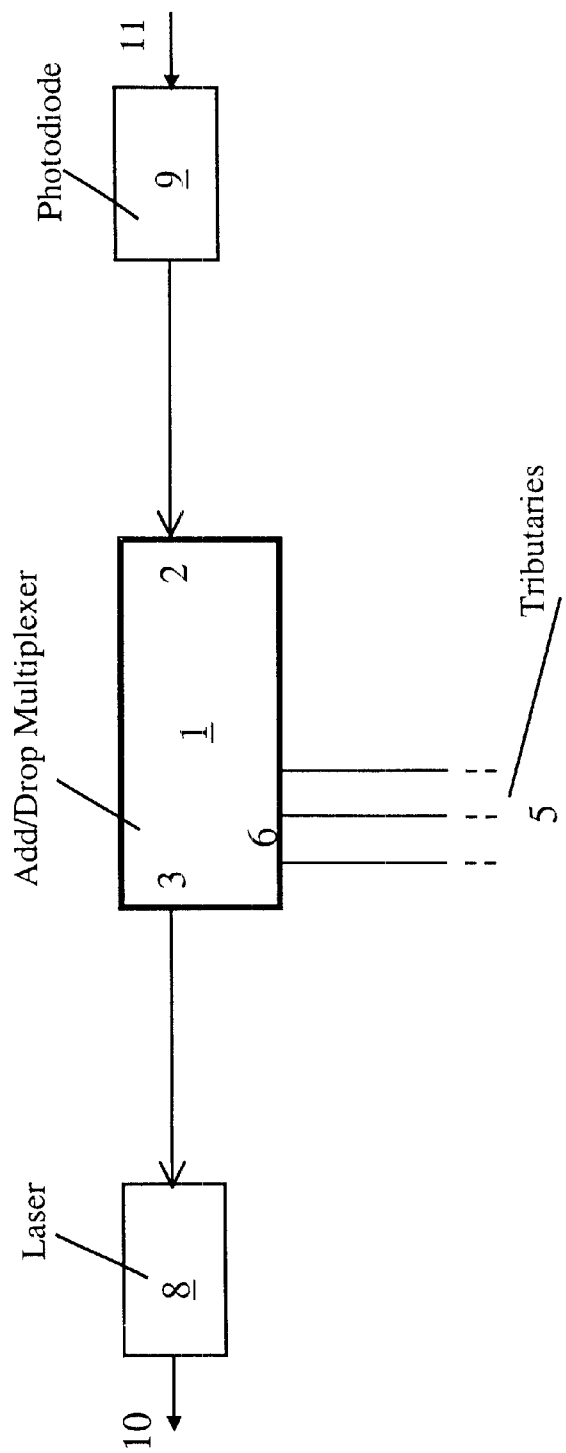
FIG. 1 shows part of a single-channel photonics communications network.

In FIG. 1 shows a node of an optical communications network comprising a conventional, electrical add/drop multiplexer (ADM) 1 with two line ports: port 2 facing east and port 3 facing west; for simplicity each line port is shown as being uni-directional (with traffic flowing from East to West), although normally these are bidirectional with each direction occupying a separate fibre. In addition, ADM 1 has a plurality of tributary connections 5, connected to tributary port 6. The ADM also comprises switching means (not shown) for adding or dropping selected parts of the datastream passing through the ADM. The output from the West port 3 passes through an electrical to optical interface 8 (e.g., a laser). The input line to East port 2 passes through an optical-to-electrical converter 9 (e.g., a photodiode). The communications network in which the ADM 1 is connected transports signals in the optical domain between successive nodes along optical links (e.g., optical fibres) of which two are shown in FIG. 1 (10, 11). In an alternative embodiment (not shown), optical fibres are used in pairs for each link advantageously allowing direct bidirectional communication between each node of the network. In the case where the nodes are arranged in a ring configuration the use of these fibre pairs also provides a protection path in the event of damage to one of the fibres.

Figure 2:
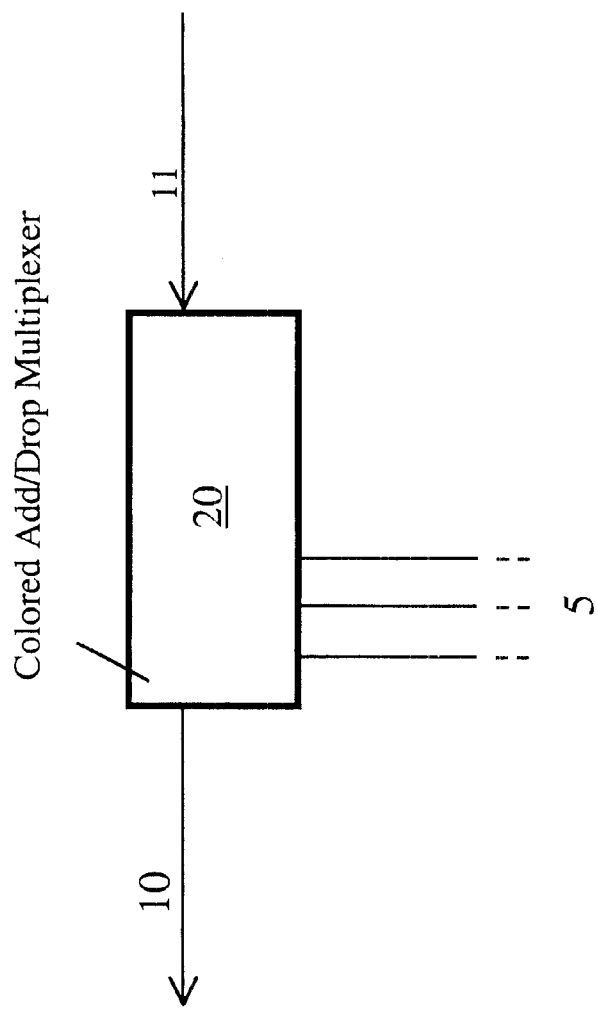
FIG. 2 shows the network of FIG. 1 partially upgraded according to an embodiment of the present invention.

In FIG. 2 the conventional, electrical ADM 1 of FIG. 1 together with electrical/optical interfaces 8 and 9 are represented by a single, colored-optically-interfaced add/drop multiplexer (COIADM) block 20. Hence the line inputs and outputs to the COIADM 20 are in the optical domain. It is important to note that all switching in the COIADM actually takes place in the electrical domain as in the case of the conventional ADM 1. The main difference between the arrangement of FIG. 2 from that of FIG. 1 lies in the optical/electrical interfaces. Whereas the electrical to optical converter 8 of FIG. 1 use a low-cost "grey", laser i.e. a laser generating an output with a center wavelength designed to lie in the low loss region of the fibre within a relatively wide spectral range, the optical to electrical converter of COIADM 20 comprises a precision laser emitting light with a center wavelength constrained to lie within a comparatively narrow spectral range. Such precision lasers are often referred to as "colored". Hence the COIADM 20 of FIG. 2 can function in a similar way to the arrangement of FIG. 1 in communicating via a single optical channel across the optical links 10 and 11. Although no increase in traffic is achieved at this stage, it is to be noted that the COIADM is now using only a small fraction of the available spectrum, i.e. of the capacity of optical links 10 and 11.

Figure 3:
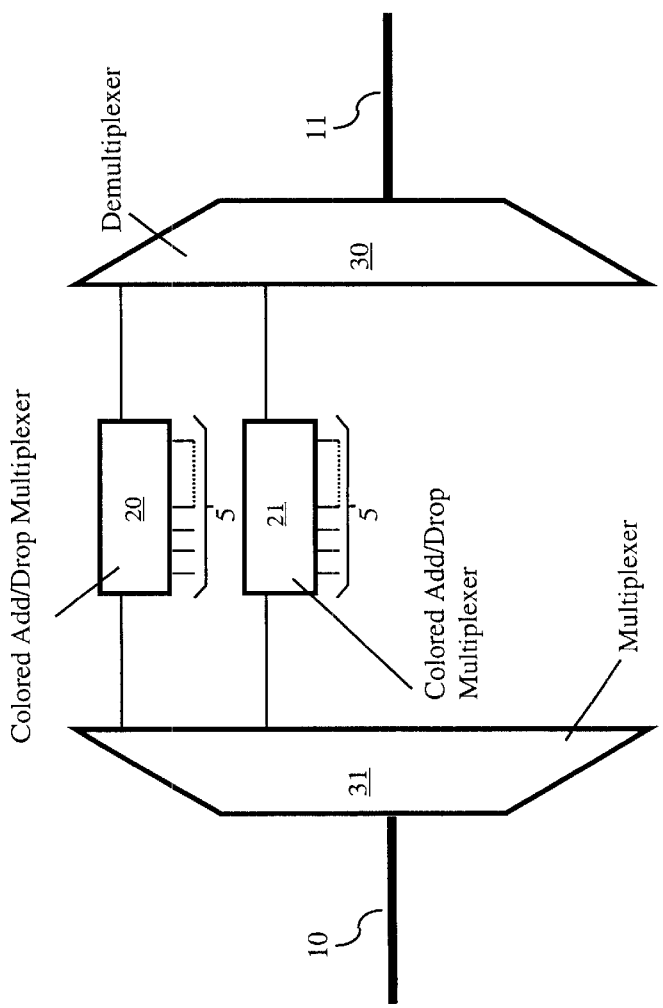
FIG. 3 shows the communications network of FIG. 2 upgraded further according to a further embodiment of the present invention.

FIG. 3 shows the COIADM 20 of FIG. 2 now connected to the optical links 10 and 11 via optical demultiplexer 30 and optical multiplexer 31 (e.g. 16 or 32 port diffraction grating type multiplexers having 3 dB insertion loss per channel). Optical demultiplexer 30 acts to divide up optical signals received from link 11 according to their wavelength and to feed signals of the appropriate wavelength to COIADM 20, i.e. signals matched to the specific transmission band of the precision laser of COIADM 20. Optical multiplexer 31 acts to combine signals on various wavelengths received at its input onto the single optical link 10 at its output. Hence if the laser of COIADM 20 is selected to produce light concentrated at a wavelength $\lambda_1$, of the spectrum, optical demultiplexer 30 will be arranged to pass radiation with a spectrum centered around $\lambda_1$, from optical link 11 to the photo-detector of COIADM 20 and no other wavelength channels. Hence COIADM 20 receives and transmits only the $\lambda_1$ WDM channel. In addition to the first COIADM 20, the arrangement of FIG. 3 has a second COIADM 21 which is connected between optical demultiplexer 30 and optical multiplexer 31 in parallel with COIADM 20. Second COIADM 21 is identical to COIADM 20 except that, in COIADM 21 the precision narrow band laser provided emits radiation in a different part of the spectrum (say $\lambda_2$). COIADM 21 is connected at its input to a second output from optical demultiplexer 30 that provides light received from optical link 11 in the $\lambda_2$ part of the spectrum and no other colors. Both COIADMs are provided with a plurality of tributaries 5. Messages input to COIADM 20 via tributaries 5 will therefore be transmitted through the communications network on a first WDM channel (i.e. the $\lambda_1$ channel) whilst messages input on tributaries 5 to COIADM 21 will be transmitted through the optical communications network on a different WDM channel (i.e. the $\lambda_2$ channel) via the same fibre links 10, 11 that were previously used (in the arrangements of FIGS. 1 and 2) for a single channel. Hence the traffic carrying capacity of the optical communications network has been doubled with a minimum of extra hardware.

Advantageously, where a protection path is available, as described above, the upgrade of the network, as described above with reference to FIG. 3, may be achieved whilst avoiding significant disruption to traffic as follows. To upgrade the network the protection (i.e. unused) path is first upgraded as described and then the traffic is switched quickly to it, so as to cause the minimum of disruption to the traffic. The original, working path is then upgraded in turn.

If at some later stage the increase in data traffic makes a further upgrade of the traffic handling capacity of the optical communications network desirable, this may be simply and economically achieved by adding a further COIADM to each node of the optical communications network between which the additional traffic handling capacity is required. This third COIADM (not shown) would simply connect to a third output of demultiplexer 30 and the corresponding input on optical multiplexer 31. As each output of optical demultiplexer 30 selects light from a different part of the spectrum, the signals seen by the third COIADM will comprise a further WDM channel distinct from the "$\lambda_1$" and "$\lambda_2$" WDM channels used by the first two COIADMs 20 and 21. The third COIADM will be provided with a precision laser that emits radiation in a narrow band in a different part of the spectrum to those of COIADMs 20 and 21, the narrow band corresponding to the band selected by optical demultiplexer 30 at the third output port thereof.

Advantageously, once the original communications network has been upgraded to include the optical demultiplexer 30 and optical multiplexer 31 further upgrades of the system may be simply and economically achieved without causing any noticeable disruption to traffic. All that is required is to provide a new COIADM with an appropriate precision laser to each switch node between which extra traffic is to be transported and to connect said new COIADM to the appropriate spare port provided on each of demultiplexer 30 and mutiplexer 31.

Figure 4A:
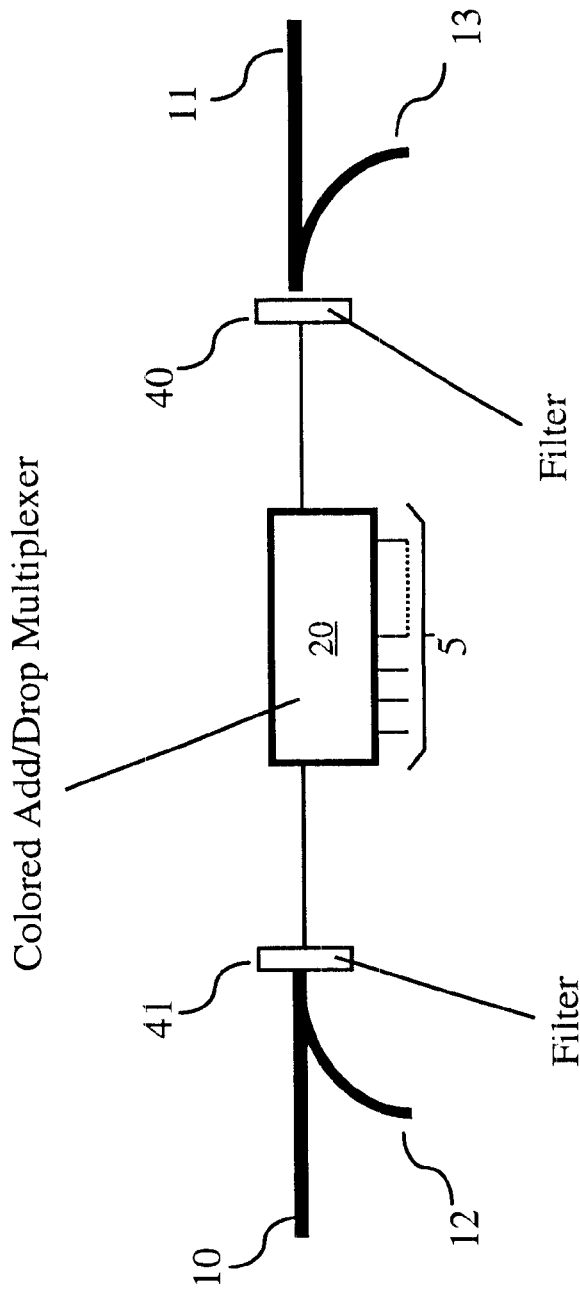

Demultiplexer 30 and multiplexer 31 may be installed at the initial "optical" upgrade stage so that any number up to 32 and beyond of additional connections are available for the provisioning of additional COIADMs. This incurs some expense at the initial upgrade stage, the benefit from which will rise in due time as further COIADMs are fitted in response to rising traffic demands FIGS. 4(a) and (b) show an alternative arrangement to that shown in FIG. 3 in which the demultiplexer/multiplexer 30, 31 are dispensed with. Advantageously, according to the embodiment of FIGS. 4 (a) and (b) a "daisy chain" upgrade sequence is provided according to which extra components may be added only when extra capacity is required. The system of FIG. 4 supports unidirectional working with information flowing from East to West, as in FIG. 3. With reference to FIG. 4(a), demultiplexer/multiplexer 30, 31 are replaced by low-cost three-port passive optical components 40, 41 (e.g. thin film dielectric filters) having a narrow-band select function. Filter 40 receives at a first port optical input signals from optical guide 11. Filter 40 selects signals in a narrow spectral band from the input signals for output at a second port feeding the East line input port of COIADM 20 and passes input signals outside of the narrow spectral band to a third port feeding optical guide 13 provided for future upgrades. Optical guide 13 is shown as a "dead-end" or tail in FIG. 4(a) and signals passed to it by filter 40 are effectively discarded. Referring now to optical filter 41, this is similar to filter 40 but is configured differently. The input to filter 41 comprises the narrow band optical signal output by COIADM 20 at the West line port thereof. This signal is passed by filter 41 to optical guide 10 via a second, output port. As with filter 40, filter 41 has a third port connected to an optical guide tail 12 provided for future upgrades. The third port of filter 41 is arranged so that optical signals received from optical guide 12 will be combined with the narrow band signals from COIADM 20 and the combined signal output from the second, output port to optical guide 10.

Advantageously, where a protection path is available, as described above, the upgrade of the network, as described above with reference to FIG. 4(a), may be achieved whilst avoiding significant disruption to traffic as follows. To upgrade the network the protection (i.e. unused) path is first upgraded as described and then the traffic is switched quickly to it, so as to cause the minimum of disruption to the traffic. The original, working path is then upgraded in turns Referring now to FIG. 4(b), we see the system of FIG. 4(a) now upgraded with the addition of a second COIADM 21. Advantageously, this upgrade is achieved without any disruption to traffic on optical guides 10 and 11, as follows. New COIADM 21 is connected between optical filters 42 and 43 that function in a similar way to filters 40 and 41, described above, respectively. The only difference in their function is that, while filters 40 and 41 select and combine signals, respectively, in a first wavelength band, e.g. "$\lambda_1$" corresponding to a first WDM channel, filters 42 and 43 select and combine signals, respectively, in a second wavelength band, e.g. "$\lambda_2$" corresponding to a second WDM channel. As with filters 40 and 41 in FIG. 4(a), filters 42 and 43 connect at the third ports thereof to optical guide tails 15 and 14, respectively, provided for future upgrades.

When further requirements for transmission traffic capacity make additional COIADM equipment necessary further pairs of filter can be provided with this additional COIADM and can be installed without further disruption to the traffic.

Figure 4B:
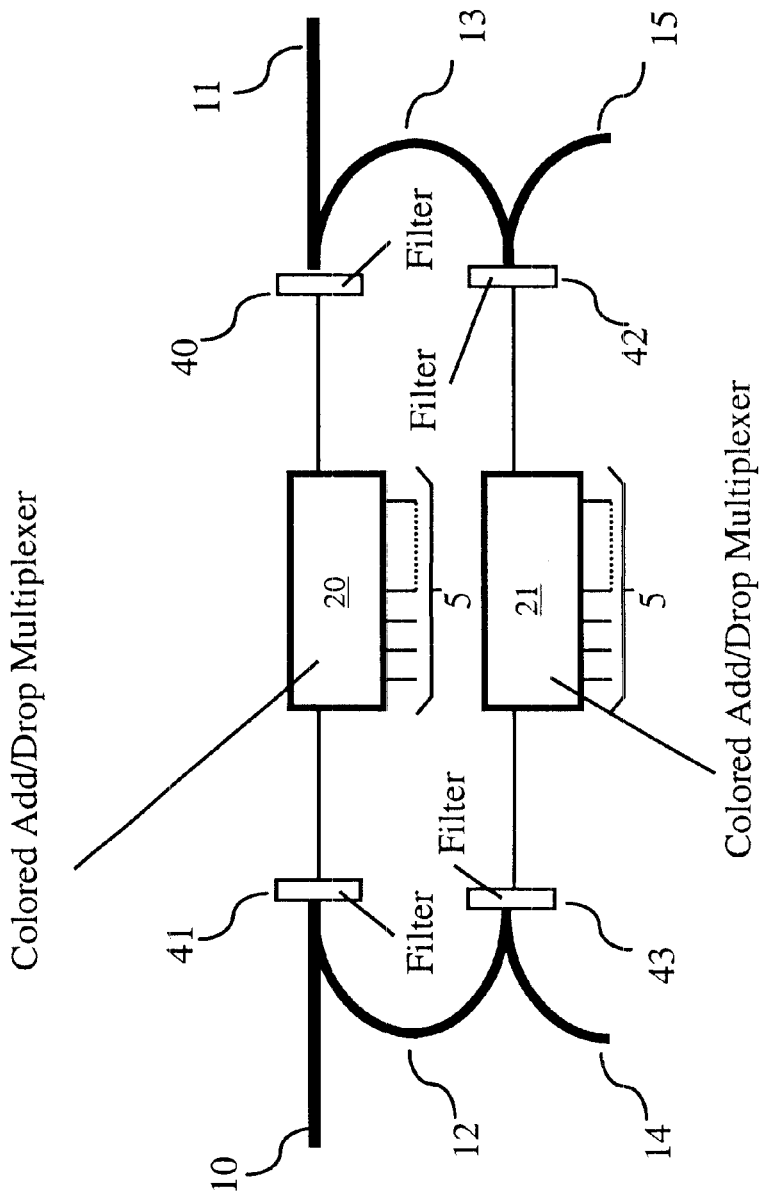
Figure 5:
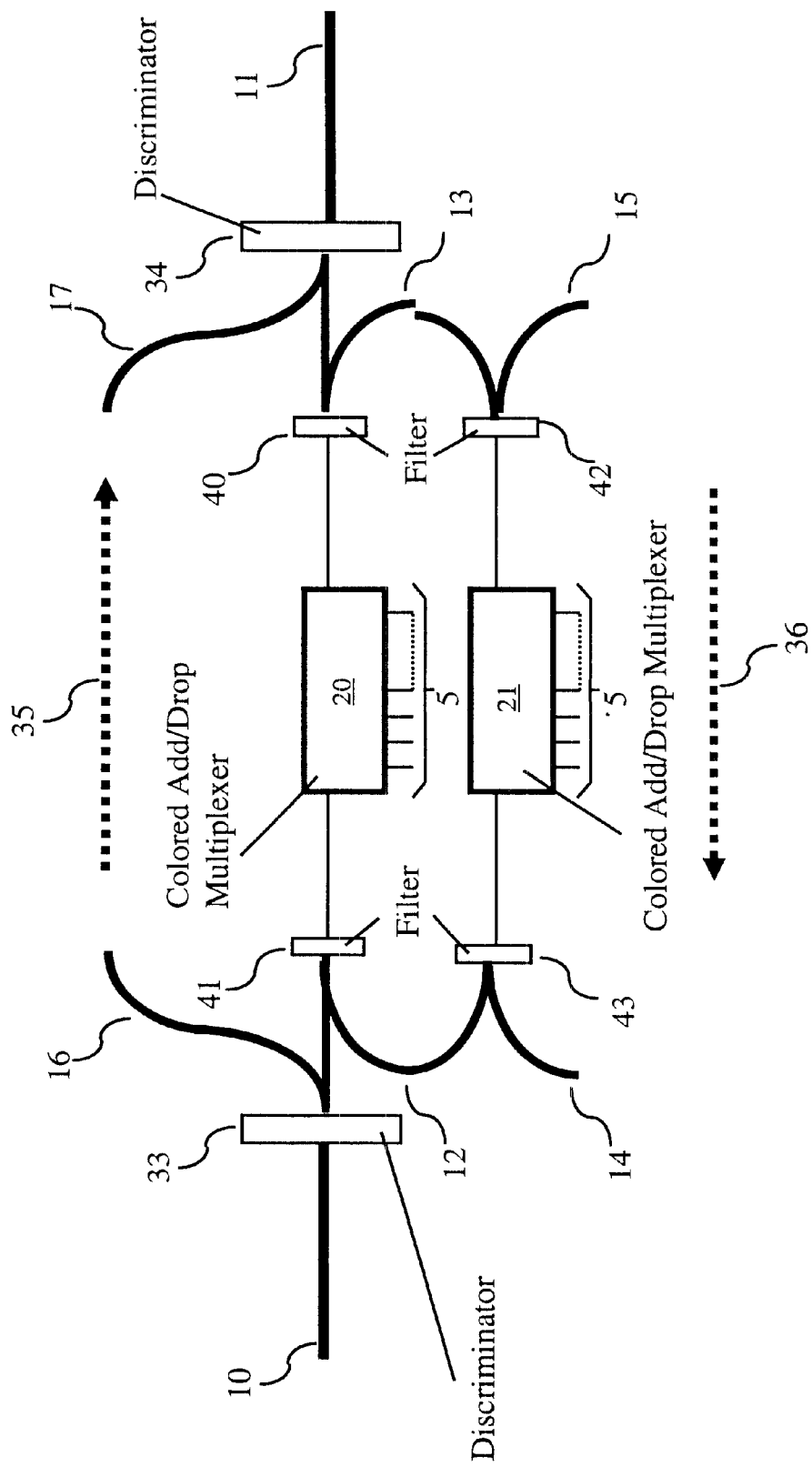
Figure 6:
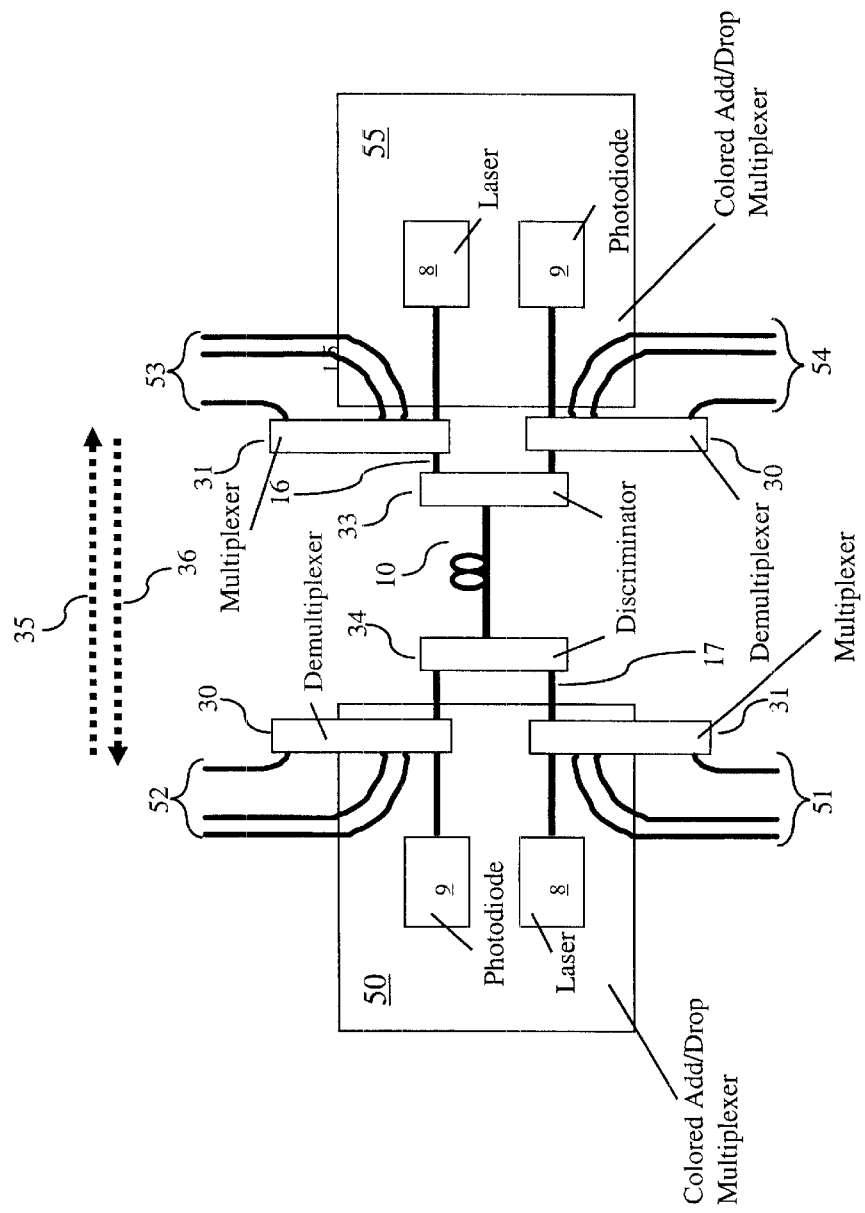

FIGS. 5 and 6 illustrate arrangements for bidirectional communication over a single fibre ("single fibre working"). Referring to FIG. 5, this shows a single fibre arrangement used with the 'daisy chain' upgrade strategy described above with reference to FIG. 4. Features common to FIG. 4(b) are given the same reference numerals and will not be described further here. Passive optical components 33 and 34 are provided with at least three ports for separating traffic traveling in different directions on the fibre path 10, 11. These are band discrimination devices that act to pass light of a first spectral band in one direction and to pass light of a different spectral band in the opposite direction. In practice the first band may consist of the 1.3 nanometer (nm) waveband used for carrying a plurality of WDM channels and the second band may consist of the 1.5 nm band used for carrying a further plurality of WDM channels. An optical directional coupler (e.g., a thin film dielectric filter) serves this function. The operation of the system of FIG. 5 will now be described initially as a unidirectional system. Considering first traffic passing, as before, from East to West (i.e., in the direction of arrow 36): band discriminator 34 receives at a first input port optical input signals from optical guide 11. Band discriminator 34 selects signals in a first broad spectral band (e.g., the 1.3 nm band) from the input for output at a second port feeding the input ports of filters 40, 42. Band discriminator 34 allows signals of the second broad spectral band (e.g., the 1.5 nm band) to pass between the input port and a third port connected to optical guide 17. Optical guide 17 is shown as a tail and, in the unidirectional mode, signals passed to it by filter 40 are effectively discarded. Referring now to band discriminator 33, this is similar to band discriminator 34 but is configured differently. The East input port of band discriminator 33 is connected to the West output ports of filters 41, 43. Band discriminator 33 is arranged to pass signals comprised in the first broad spectral band between the first port thereof and a second, output port thereof connected to optical guide 10. As with band discriminator 34, band discriminator 33 has a third port connected to an optical guide tail 16 provided for bidirectional working. The third port of band discriminator 33 is arranged to pass optical signals comprised in the second broad spectral band between the second and third ports thereof, i.e., between optical guides 10 and 16.

The operation of the system of FIG. 5 will now be described as a bidirectional system. As will be evident from the above description of the unidirectional operating mode, signals of the second broad spectral band arriving at the third West port of band discriminator 33, i.e. in the direction of arrow 35, will pass there-through to emerge from the second port thereof and hence into optical guide 16. Similarly, signals of the second broad spectral band arriving at the second port of band discriminator 34 from optical guide 17 will pass therethrough to emerge from the first East port thereof and hence into optical guide 11. In order to achieve bidirectional working, a second "daisy chained" ADM arrangement (not shown but, e.g. as in FIG. 4(b)), is added between optical guides 16 and 17 of the system of FIG. 5. This second ADM arrangement differs from that shown connected between band discriminators 33 and 34 of FIG. 5 in that signals flow in the opposite direction, i.e. from West to East. As with the system of FIG. 4, described above, further COIADMs may be added to either "daisy chain" as required. Hence, advantageously, a fully bidirectional multichannel single fibre working ADM system may be created and incrementally upgraded from a basic, single channel unidirectional system with minimum disruption to traffic.

According to an alternative embodiment of the present invention, a thin film or multilayer dielectric filter can be used to separate alternate WDM channels into two "combs" (i.e. series of spaced WDM channels). A first comb can be assigned to carry East traffic and the other to West traffics FIG. 6 shows a bidirectional multi-channel single fibre working ADM system according to a further embodiment of the present invention. Features common to FIG. 5 are given the same reference numerals and will not be described further here. However, some extra description is given below in view of the different arrangement of the elements of FIG. 6 compared with earlier figures. Whereas earlier figures showed a single node (comprising one or more COIADMs connected to East and West optical guides of a communications link, FIG. 6 shows one such optical communications link 10 connected between two logically adjacent nodes, one node comprising band discriminator 34 and COIADM 50, the other node comprising band discriminator 33 and COIADM 55. Unlike earlier representations of COIADMs, the COIADMs 50 and 55 are bidirectional, each comprising an electrical to optical interface 8 (e.g. a laser) and an optical-to-electrical converter 9 (e.g. a photodiode) per line port (one port shown). Hence a bidirectional connection is shown between the East line port of COIADM 50 via band discriminator 34, single optical guide 10 and band discriminator 33 to the West line port of COIADM 55. As before, each of ADMs 50, 55 also comprises a plurality of tributary connections (not shown) connected to tributary port (not shown) and switching means (not shown) for adding or dropping selected parts of the datastream passing through the ADM.

In contrast to the systems of FIGS. 4 and 5, the system of FIG. 6 uses optical demultiplexers 30 to distribute multiple spectrally separate optical signals received from optical link 10 (via one of band discriminators 34 and 33) between COIADM 50 or 55 (as the case may be) and, via links 52 or 54 (as the case may be), a plurality of further COIADMs (not shown). In a similar way, the system of FIG. 6 uses optical multiplexers 31 to concentrate onto optical link 10 (via one of band discriminators 34 and 33) multiple spectrally separate optical signals received from COIADM 50 or 55 (as the case may be) and, via links 51 or 53 (as the case may be), from the plurality of further COIADMs (not shown). The optical demultiplexers 30 and optical multiplexers 31 may be collected with one of the COIADMs, as shown, or separately accommodated. The plurality of COIADMs may be collocated or physically separated according to space constraints and/or the geographical distribution of users.

Note that the directional coupler function, described above with reference to FIG. 4, can be integrated into the multiplexers/dermultiplexers if Bragg Grating types and Waveguide types, e.g., as taught by M.Smit are deployed.

As with the previous embodiments, to upgrade with small interruption to the traffic, equipment upgrade may be carried out on the protection route not currently carrying traffic (where available). Additional WDM paths are provided with the introduction of the multiplexer and demultiplexer into the optical path. Modifications to give duplex operation (bidirectional traffic) may be made at this time.

Figure 7:
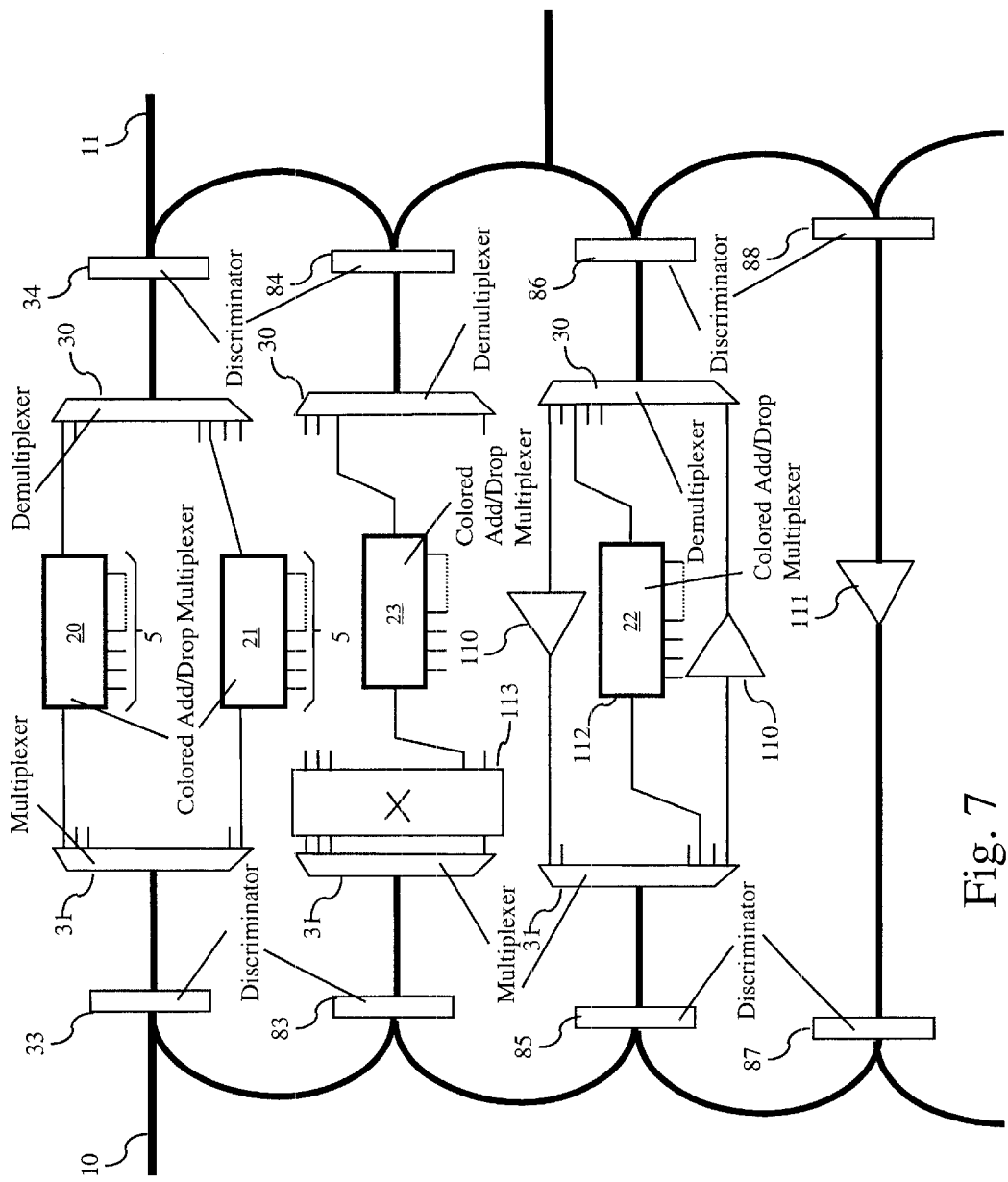

FIG. 7 shows a further embodiment of the present invention. Features common to earlier figures are given the same reference numerals and will not be described further here. Band discriminators 34, 84, 86, 88 (e.g., thin film dielectric filters) are similar units except that each selects a different optical spectral band for passing through to demultiplexers 30 or optical band amplifier 111, as the case may be. Band discriminators 33, 83, 85, 87 (e.g., thin film dielectric filters) are similar units except that each selects a different optical spectral band for passing through from multiplexers 31 or optical band amplifier 111, as the case may be. In fact, as illustrated by the optical channel amplifiers 110, demultiplexers 30, multiplexers 31 and 33, 83, 85, 87 are all bidirectional devices such that their function depends on the way they are connected rather than their internal structure. Hence COIADM 21 could be configured to pass signals from East to West or vice versa (or both). Where some optical spectral channels received via optical links 10 and 11 are not to be switched (added or dropped) at the present node, they are advantageously passed through the node via a suitable optical amplifier 110 (e.g., an Erbium doped fibre amplifier or a semiconductor optical amplifier) connected between the relevant ports of multiplexer/demultiplexers 30, 31. As shown, amplifier 110 provides an amplified through path for a WDM channel. Where some entire optical spectral bands received via optical links 10 and 11 are not to be multiplexed/demultiplexed or switched (added or dropped) at the present node, they are advantageously passed through the node via a suitable optical amplifier 111 connected between the relevant ports of band discriminators 33, 83, 85, 87, 34, 84, 86, 88. Optical amplifier 111 may be of similar type to amplifier 110 or specially designed to be suitable for several WDM channels and possibly arranged to have a similar gain independent of the number of WDM signals at its input. 104 to 106 are optical demultiplexer and multiplexer pairs.

Advantageously, connections between ports of demultiplexers 30, multiplexers 31 (i.e. via COIADMs) need not connect corresponding ports but may be staggered as illustrated by the connection to COIADM 21. The electrical to optical interface of COIADM 21 would need to be selected to match the waveband accepted by the relevant input port to multiplexer 31. Such staggered connection provides a simple and flexible means of channel swapping, or wavelength conversion whereby a signal received on a first WDM channel may be output on a different channel.

An optical space switch 113 (e.g., such as the thermally activated silica waveguide array switch described by K.Okamoto Tutorial ECOC'98 Sep. 20 Madrid 1998) is connected to the demultiplexed ports of a demultiplexer 31 to give the capability of selecting a particular COIADM and therefore the wavelength (optical channel) to be taken to and over the next fibre segment. This provides additional protection against failures in equipment e.g., if COIADM 23 has failed an alternative COIADM connected to an output of space switch 113 could be selected and the traffic routed thereby.

Figure 8:
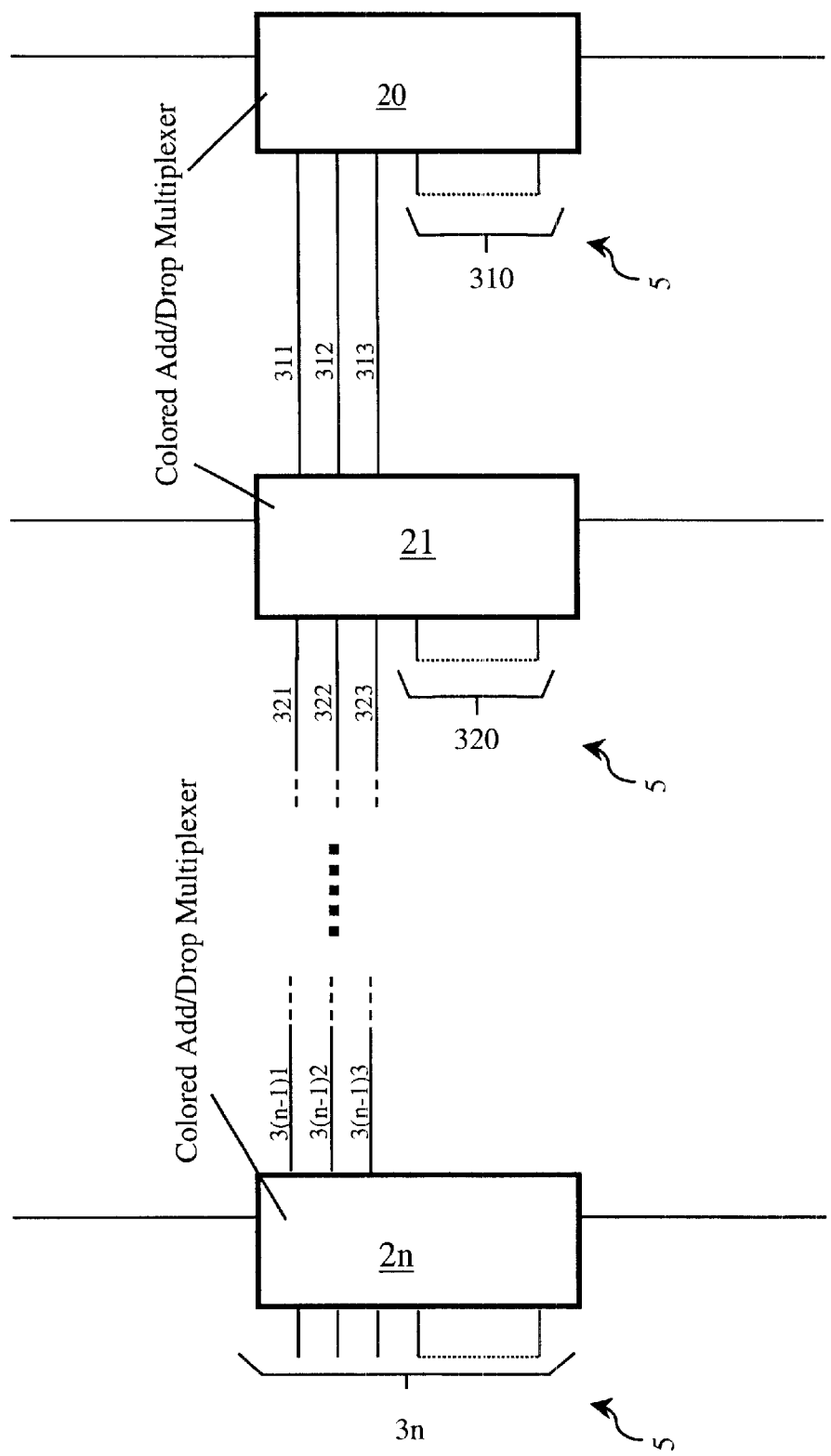

FIG. 8 shows a part of a switching node according to the present invention. In FIG. 8 the ADMs 20, 21 . . . 2n of a node are shown in more detail. In particular, the tributary connections 5 are shown separated into two sub-groups. A first sub-group 311, 312, 313 from first ADM 20 are taken to the next ADM 21, thus allowing interchange of demultiplexed messages there-between. A second sub-group 310 from first ADM 20 function as before to communicate demultiplexed messages to users and to input messages from users to the ADM for multiplexing.

In a similar way a sub-group 321, 322, 323 from second ADM 21 are taken to third ADM (not shown). This is repeated so that each ADM is interconnected via a sub-group of tributary connections to the next ADM until the penultimate ADM (not shown) has tributary connections 3(n−1)1, 3(n−1)2, 3(n−1)3 taken to the last ADM In of the node. According to this so-called "daisy chain" arrangement, each ADM is arranged to pass on messages received from an adjacent ADM via the tributary connections but intended for another ADM further along the "daisy chain" until that destination ADM is reached. On receiving a message via the tributary connections that is intended for a channel handled by that ADM, the ADM will remultiplex it into the message stream for that channel in a similar way to messages received from users via conventional tributary inputs.

Hence the node of FIG. 8 advantageously allows messages from a first WDM channel to be converted to the electrical domain, demultiplexed using the conventional ADM circuitry and to be passed in its demultiplexed, electrical state to a selected other one of the ADMs of that switch node where it is multiplexed into the data stream of a second WDM channel using the conventional ADM circuitry and converted back into the optical domain in the appropriate waveband for the second WDM channel. Advantageously, messages of any level of granularity handled by the ADMs may be switched in this way.

Although the illustration of FIG. 8 shows a "daisy chain" interconnection of the ADMs of a node, other interconnection patterns may be used according to preferred embodiments of the present invention, including a ring, full mesh or partial, "nearest neighbors" mesh. This interconnection may be implemented within a node in such a way that effective interconnectivity can be achieved in an incremental fashion as the equipping of a node progresses to accommodate increased traffic demand, e.g. by adding extra ADMs to a node as and when required.

According to the embodiment of FIG. 9, the relevant tributaries could be interconnected via a separate switch unit 18 designed to provide the required switch connections and capacity. Switch 18 could also be incrementally upgradable. Extra provision will be required to manage this new switch element within the network management system.

It may be desirable not to collocate all the ADMs of a node because of space constraints in current exchange buildings so that the interconnection of the tributaries 311, 312 313, etc. of FIG. 8 or 9 may entail the distribution of digital data over relatively long distances. According to a further preferred embodiment of the present invention, optical fibre interconnections utilizing WDM principles are applied to the interconnection of the ADM tributaries. As TDM rates and the number of tributary interconnections increase, switch 18 may provide optical matrix switching to switch messages between interconnected tributaries, according to a further embodiment.

Although described above substantially with reference to unidirectional optical paths, the present invention applies equally to the case of upgrading a bidirectional link in which a single optical channel using grey light is used in each direction. Each direction of the link may be upgraded, as described above with reference to a single direction.

We claim:

1. A method for upgrading an optical communications system; in which the system comprises a plurality of nodes of which two are linked by a single optical path for the communication, from the node at a first end of the optical path to the node at the other end of the optical path, of traffic comprising a single optical channel; in which each node comprises add/drop multiplex (ADM) means for adding and dropping signals in electrical form, in which the node at the first end of the optical path comprises a single light source for converting from electrical to optical form signals output by the ADM means for transmission via the optical path; and in which the node at the other end of the optical path comprises a photodetector for converting signals received via the optical path for input to the ADM means;

the method including the steps of replacing the single light source at the first end of the optical path with one or more stable narrowband light sources having mutually different wavelengths; installing at the first end of the optical path optical multiplex means for guiding the outputs of the one or more stable narrowband light sources into the optical path in which the optical multiplex means comprises at least one further input for allowing for future installation of at least one further stable narrowband light source having a different wavelength to the one or more stable narrowband light sources; replacing the single photodetector at the other end of the optical path with a plurality; and installing at the other end of the optical path optical demultiplex means for demultiplexing a like plurality of received optical channels, whereby each of the plurality of optical channels is converted to electrical signals and applied to the ADM means for future upgrading of the optical communications system without further interruption to traffic therein.

2. A method for upgrading an optical communications system; in which the system comprises a plurality of nodes linked by one or more optical paths, each path for the communication of traffic comprising a single optical channel; in which each node comprises add/drop multiplex (ADM) means for adding and dropping signals in electrical form, and conversion means for converting between electrical and optical form signals output by the ADM means for transmission via a first one of the optical paths; and for converting signals received via a second one of the optical paths for input to the ADM means;

the method comprising the steps of installing optical demultiplex means for selecting signals received via the second one of the optical paths according to wavelength for input to the ADM means; installing means for converting the signals output by the ADM means into a first stable narrow wavelength band optical signal; and installing optical multiplex means for guiding the first signal into the first optical path and comprising means for allowing one or more further stable narrow wavelength band optical signals having different wavelengths from the first signal to be added and combined with the first signal into the first optical path.

3. The method as claimed in claim 2 comprising the steps of installing further ADM means, selecting further signals received via the second one of the optical paths according to wavelength for input to the further ADM means, installing means for converting the signals output by the further ADM means into further narrow wavelength band optical signals having different wavelengths from the first and combining the first and the further narrow wavelength band optical signals into the first optical path.

4. The method as claimed in claim 2 comprising the step of demultiplexing the signals received via the second optical path in a series of sequential steps.

5. The method as claimed in claim 2 comprising the step of combining the first narrow wavelength band optical signal with the one or more further narrow wavelength band optical signals in a series of sequential steps.

6. The method as claimed in claim 2 comprising installing an optical multiplexer and demultiplexer each having a multiplicity of spectrally distinct narrow band ports to form one or more additional optical paths through a segment of the optical communications system, each additional optical path for upgrading the optical communications system without further interruption to traffic therein.

7. The method of claim 6 comprising using an optical multiplexer and demultiplexer each comprising a first port for the selection of a narrow wavelength band channel comprising the first one of the demultiplexed signals; the optical multiplexer and demultiplexer each comprising a second port for selection of a plurality of further wavelength band channels; each further channel for upgrading the communications system without further interruption to traffic therein.

8. The method of claim 7 comprising linking multiplexer ports with demultiplexer ports via signal amplification means.

9. The method of claim 6 comprising linking multiplexer ports with demultiplexer ports via space switch means.

10. The method of claim 2 comprising using broad band optical directional couplers for single fibre working over one or more of the optical paths.

11. The method of claim 2 together with the use of single fibre working over one or more of the optical paths using different wavelength channels to communicate in each direction.

12. The method of claim 2 using a spectrum comb interleaver to separate alternate channels into two sets, a first set for communication in a first direction through the optical communications system and a second set for communication in the opposite direction therethrough.

13. The method of claim 2 in which the demultiplexed signals comprise time division multiplexed (TDM) data streams.

14. The method of claim 13 in which different ones of the demultiplexed signals comprise different rate and/or format TDM data streams.

15. The method of claim 2 comprising controlling the ADM means by a Network Management System.

16. The method of claim 2 for use in a protected optical communications network, comprising upgrading a protection path, then switching traffic from a working path to the protection path, then upgrading the working path.

17. The method as claimed in claim 2 in which the first and second optical paths are the same path.

18. The method of claim 2 comprising switching individual time division multiplexed messages between a plurality of streams of time division multiplexed data; in which each stream of time division multiplexed data is comprised in a channel of the wavelength multiplexed optical communications system, the method comprising the steps of providing one or more of the nodes with a plurality of add drop multiplex (ADM) means, one per WDM signal; providing each ADM means with tributary means and interconnecting the ADM means via the tributary means.

19. The method of claim 2 comprising switching individual time division multiplexed messages between wavelength multiplexed channels of the optical communications system, comprising the steps of arranging switch means comprising a plurality of add drop multiplex (ADM) means, one per wavelength multiplex channel; in which each ADM means comprises tributary means, the method comprising the steps of interconnecting the ADM means via the tributary means.

20. A means for upgrading a wavelength multiplexed optical communications system according to the method of claim 2.

* * * * *